(12) United States Patent
Spitzer et al.

(10) Patent No.: US 9,092,573 B2
(45) Date of Patent: Jul. 28, 2015

(54) SYSTEM, METHOD, AND COMPUTER PROGRAM PRODUCT FOR TESTING DEVICE PARAMETERS

(75) Inventors: John F. Spitzer, Wimberley, TX (US); Oleg Vyacheslavovich Vinogradov, Moscow (RU); Sergey Sergeevich Grebenkin, Moscow (RU)

(73) Assignee: NVIDIA Corporation, Santa Clara, CA (US)

( * ) Notice: Subject to any disclaimer, the term of this patent is extended or adjusted under 35 U.S.C. 154(b) by 265 days.

(21) Appl. No.: 13/543,228

(22) Filed: Jul. 6, 2012

(65) Prior Publication Data

US 2014/0013159 A1    Jan. 9, 2014

(51) Int. Cl.
*G06F 11/00* (2006.01)
*G06F 11/36* (2006.01)

(52) U.S. Cl.
CPC ........ *G06F 11/3668* (2013.01); *G06F 11/3676* (2013.01)

(58) Field of Classification Search
CPC . G06F 11/22; G06F 11/2257; G06F 11/2247; G06F 11/2289; G06F 11/26; G06F 11/261; G06F 11/263; G06F 11/3668; G06F 11/3676
USPC .......... 714/3, 25, 26, 27, 32, 33, 37, 38.1, 39, 714/40, 44, 47.1, 47.2, 47.3
See application file for complete search history.

(56) References Cited

U.S. PATENT DOCUMENTS

| | | |
|---|---|---|
| 5,086,386 A | 2/1992 | Islam |
| 5,671,351 A | 9/1997 | Wild et al. |
| 5,958,058 A | 9/1999 | Barrus |
| 6,044,476 A | 3/2000 | Ote et al. |
| 6,059,842 A | 5/2000 | Dumarot et al. |
| 6,314,479 B1 | 11/2001 | Frederick et al. |
| 6,646,653 B2 | 11/2003 | San et al. |
| 6,753,881 B1 | 6/2004 | Callway et al. |
| 6,768,519 B2 | 7/2004 | Fujita et al. |
| 6,847,358 B1 | 1/2005 | Ford et al. |
| 6,850,973 B1 | 2/2005 | Larson et al. |
| 6,901,580 B2 | 5/2005 | Iwanojko et al. |
| 7,034,828 B1 | 4/2006 | Drebin et al. |
| 7,080,247 B2 | 7/2006 | Rochford, II et al. |
| 7,243,371 B1 | 7/2007 | Kasper et al. |
| 7,293,201 B2 | 11/2007 | Ansari |
| 7,299,382 B2 | 11/2007 | Jorapur |
| 7,603,445 B1 | 10/2009 | Fehrle |
| 7,626,944 B1 | 12/2009 | Riddle |
| 7,778,936 B2 | 8/2010 | Adhikari |

(Continued)

FOREIGN PATENT DOCUMENTS

TW    201205427 A    2/2012

OTHER PUBLICATIONS

Advisory Action from U.S. Appl. No. 12/001,669, dated Oct. 14, 2011.

(Continued)

*Primary Examiner* — Joseph D Manoskey
(74) *Attorney, Agent, or Firm* — Zilka-Kotab, PC

(57) ABSTRACT

A system, method, and computer program product are provided for testing device parameters. In use, a plurality of device parameters is determined, utilizing a directed acyclic graph (DAG). Further, the determined plurality of device parameters is tested.

18 Claims, 4 Drawing Sheets

(56) References Cited

U.S. PATENT DOCUMENTS

| | | | |
|---|---|---|---|
| 8,171,342 B2 | 5/2012 | Wu | |
| 8,276,133 B1 | 9/2012 | Lebaredian et al. | |
| 8,280,864 B1 | 10/2012 | Herz et al. | |
| 8,296,781 B1 | 10/2012 | Lebaredian et al. | |
| 2001/0008021 A1 | 7/2001 | Ote et al. | |
| 2002/0073415 A1 | 6/2002 | Kim et al. | |
| 2002/0083228 A1 | 6/2002 | Chiloyan et al. | |
| 2002/0095501 A1 | 7/2002 | Chiloyan et al. | |
| 2003/0023841 A1 | 1/2003 | Atherton et al. | |
| 2003/0033519 A1 | 2/2003 | Buckman et al. | |
| 2003/0055930 A1 | 3/2003 | Haneda | |
| 2003/0140333 A1 | 7/2003 | Odaka et al. | |
| 2003/0225917 A1 | 12/2003 | Partamian et al. | |
| 2004/0187103 A1 | 9/2004 | Wickham et al. | |
| 2004/0199615 A1 | 10/2004 | Philyaw | |
| 2004/0212610 A1 | 10/2004 | Hamlin | |
| 2004/0249618 A1* | 12/2004 | Fine et al. | 703/2 |
| 2005/0076002 A1 | 4/2005 | Williams et al. | |
| 2005/0104888 A1 | 5/2005 | Ford et al. | |
| 2005/0120208 A1 | 6/2005 | Dobson | |
| 2005/0133067 A1 | 6/2005 | Bergman | |
| 2005/0225639 A1 | 10/2005 | Somers | |
| 2006/0112057 A1 | 5/2006 | Lai | |
| 2006/0132473 A1 | 6/2006 | Fuller et al. | |
| 2006/0188174 A1 | 8/2006 | Minadakis | |
| 2007/0002347 A1 | 1/2007 | Lai et al. | |
| 2007/0066403 A1 | 3/2007 | Conkwright | |
| 2007/0098288 A1 | 5/2007 | Raskar et al. | |
| 2007/0172140 A1 | 7/2007 | Kokemohr | |
| 2007/0268204 A1 | 11/2007 | Kawabe | |
| 2008/0005611 A1 | 1/2008 | Solyanik | |
| 2008/0040732 A1 | 2/2008 | Akiyama et al. | |
| 2008/0072077 A1 | 3/2008 | Orr | |
| 2008/0102957 A1 | 5/2008 | Burman et al. | |
| 2008/0133067 A1 | 6/2008 | DeMay | |
| 2008/0242423 A1 | 10/2008 | Kerr et al. | |
| 2008/0270569 A1 | 10/2008 | McBride et al. | |
| 2009/0011835 A1 | 1/2009 | Hansen et al. | |
| 2009/0064053 A1 | 3/2009 | Crawford et al. | |
| 2009/0069084 A1 | 3/2009 | Reece et al. | |
| 2009/0094076 A1* | 4/2009 | Reddy | 705/7 |
| 2009/0115778 A1 | 5/2009 | Ford et al. | |
| 2010/0162201 A1 | 6/2010 | Shnaiderman et al. | |
| 2010/0269137 A1 | 10/2010 | Nakajima et al. | |
| 2010/0318855 A1* | 12/2010 | Beg et al. | 714/39 |
| 2012/0155475 A1 | 6/2012 | Vasseur et al. | |
| 2012/0272220 A1 | 10/2012 | Calcagno et al. | |
| 2013/0338966 A1 | 12/2013 | Spitzer | |
| 2014/0009470 A1 | 1/2014 | Spitzer | |
| 2014/0011581 A1 | 1/2014 | Spitzer et al. | |
| 2014/0012532 A1 | 1/2014 | Spitzer et al. | |
| 2014/0013094 A1 | 1/2014 | Spitzer et al. | |
| 2014/0013303 A1 | 1/2014 | Spitzer et al. | |

OTHER PUBLICATIONS

Final Office Action from U.S. Appl. No. 12/001,669, dated Jul. 21, 2011.
Notice of Allowance from U.S. Appl. No. 12/001,669, dated Aug. 31, 2012.
Non-Final Office Action from U.S. Appl. No. 12/001,669, dated Feb. 17, 2011.
Non-Final Office Action from U.S. Appl. No. 12/001,669, dated May 11, 2012.
Final Office Action from U.S. Appl. No. 12/001,504, dated Feb. 7, 2012.
Notice of Allowance from U.S. Appl. No. 12/001,504, dated Jun. 7, 2012.
Non-Final Office Action from U.S. Appl. No. 12/001,504, dated Aug. 5, 2011.
Advisory Action from U.S. Appl. No. 11/958,266, dated Feb. 22, 2012.
Final Office Action from U.S. Appl. No. 11/958,266, dated Oct. 19, 2010.
Final Office Action from U.S. Appl. No. 11/958,266, dated Dec. 12, 2011.
Notice of Allowance from U.S. Appl. No. 11/958,266, dated Jul. 2, 2012.
Non-Final Office Action from U.S. Appl. No. 11/958,266, dated Feb. 23, 2010.
Non-Final Office Action from U.S. Appl. No. 11/958,266, dated Jun. 21, 2011.
Non-Final Office Action from U.S. Appl. No. 12/352,268, dated Feb. 10, 2012.
Ribeiro-Filho, J. L. et al., "Game: A Framework for Programming Genetic Algorithms Applications," IEEE, 1994, pp. 840-845.
U.S. Appl. No. 13/525,119, filed Jun. 15, 2012.
U.S. Appl. No. 13/543,196, filed Jul. 6, 2012.
U.S. Appl. No. 13/543,184, filed Jul. 6, 2012.
U.S. Appl. No. 13/543,212, filed Jul. 6, 2012.
U.S. Appl. No. 13/543,242, filed Jul. 6, 2012.
U.S. Appl. No. 12/352,268, filed Jan. 12, 2009.
Unigraphics Basics, Nov. 14, 2004, retrieved from https://web.archive.org/web.archive.org/web/20041114135544/http://homepages.cae.wisc.edu/~me232/ug/ug_basic.html.
Nyanchama, M. et al., "The Role Graph Model and Conflict of Interest," ACM Transactions of Information and Systems Security, Feb. 1999, pp. 3-33.
Schmid, P., "Game Over? Core 2 Duo Knocks Out Athlon 64," Jul. 14, 2006, retrieved from http://www.tomshardware.com/reviews/core2-duo-knocks-athlon-64,1282-11.html.
Non-Final Office Action from U.S. Appl. No. 12/352,268, dated Jun. 24, 2013.
Non-Final Office Action from U.S. Appl. No. 12/352,268, dated Jun. 19, 2014.
Final Office Action from U.S. Appl. No. 12/352,268, dated Dec. 21, 2012.
Final Office Action from U.S. Appl. No. 12/352,268, dated Jan. 16, 2014.
Non-Final Office Action from U.S. Appl. No. 13/543,184, dated Jul. 22, 2014.
Non-Final Office Action from U.S. Appl. No. 13/543,242, dated Oct. 6, 2014.
Final Office Action from U.S. Appl. No. 12/352,268, dated Jan. 28, 2015.
Office Action from Taiwan Patent Appl. No. 102123499, dated Nov. 25, 2014.
Non-Final Office Action from U.S. Appl. No. 13/543,212, dated Nov. 5, 2014.
Office Action from Taiwan Patent Application No. 102123862, dated Dec. 25, 2014.
Office Action from Taiwan Patent Application No. 102123858, dated Dec. 1, 2014.
Final Office Action from U.S. Appl. No. 13/543,184, dated Dec. 3, 2014.
Non-Final Office Action from U.S. Appl. No. 13/525,119, dated Feb. 5, 2015.
Hellerstein, J., "Optimizing Software Packages for Application Management," IEEE, 2008, pp. 1-8.
Advisory Action from U.S. Appl. No. 13/543,184, dated Feb. 12, 2015.
Office Action from Taiwan Patent Application No. 102123502, dated Jan. 21, 2015.
Final Office Action from U.S. Appl. No. 13/543,212, dated Mar. 18, 2015.
Non-Final Office Action from U.S. Appl. No. 131543,196, dated Mar. 18, 2015.
Notice of Allowance from Taiwan Patent Application No. 102123862, dated Apr. 22, 2015.
Final Office Action from U.S. Appl. No. 13/543,242, dated May 15, 2015.
Notice of Allowance from U.S. Appl. No. 13/543,212, dated Jun. 8, 2015.

* cited by examiner

SYSTEM, METHOD, AND COMPUTER PROGRAM PRODUCT FOR TESTING DEVICE PARAMETERS

FIELD OF THE INVENTION

The present invention relates to device parameters, and more particularly to testing device parameters.

BACKGROUND

Many products in existence today include one or more parameters that influence an overall experience associated with the product. For example, computer games and other software may have many parameters that determine a quality of rendering, audio, game play, etc. However, current techniques for arranging the parameters associated with these products have been associated with various limitations.

For example, currently, customers may be responsible for manually adjusting a plurality of parameters associated with a product in order to determine appropriate settings for that product. This may result in less than optimal settings for the product, time-consuming trial and error by the customer, etc. There is thus a need for addressing these and/or other issues associated with the prior art.

SUMMARY

A system, method, and computer program product are provided for testing device parameters. In use, a plurality of device parameters is determined, utilizing a directed acyclic graph (DAG). Further, the determined plurality of device parameters is tested.

DETAILED DESCRIPTION

Figure 1:
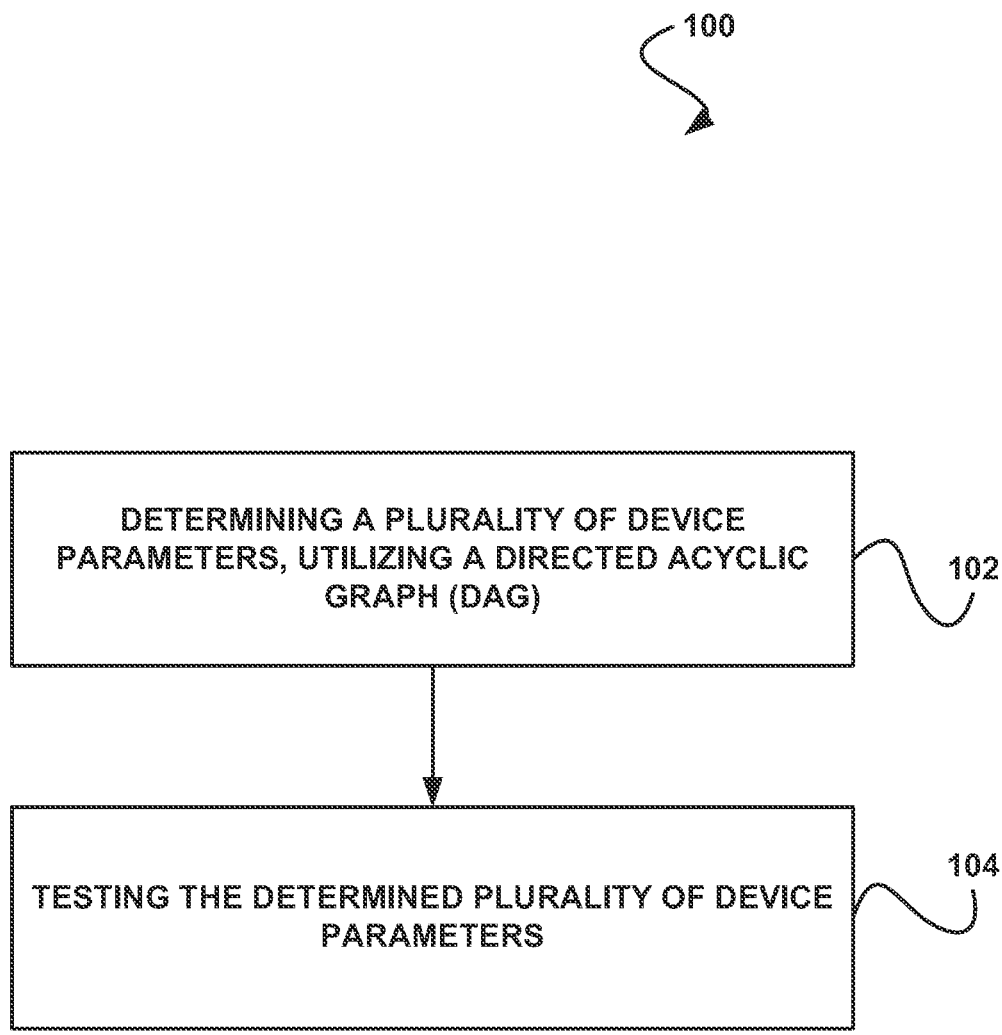
FIG. 1 shows a method for testing device parameters, in accordance with one embodiment.

FIG. 1 shows a method 100 for testing device parameters, in accordance with one embodiment. As shown in operation 102, a plurality of device parameters is determined, utilizing a directed acyclic graph (DAG). In one embodiment, the device may include any object that has a plurality of parameters associated with it. For example, the device may include an object such as a personal computer, personal digital assistant, cell phone, etc.

Additionally, in one embodiment, the plurality of parameters may include any characteristics of the device. For example, the plurality of parameters may include descriptions of hardware (e.g., a central processing unit (CPU), a graphics processing unit (GPU), random access memory (RAM), a motherboard, a display, a resolution, etc.) installed within the device (e.g., a desktop computer, laptop computer, tablet computer, personal digital assistant, cellular telephone, etc.), software (e.g., an operating system, drivers, etc.) installed within the device, etc.

Further, in one embodiment, one or more of the plurality of parameters may be independently configurable. For example, each of the plurality of parameters may be able to be altered independently from the other parameters. In another embodiment, each of the plurality of parameters may be utilized by the device to perform one or more actions. In yet another embodiment, the plurality of parameters may be determined at a server.

Further still, in one embodiment, the DAG may include a graph that is created that contains a plurality of directed nodes, where the nodes are directed based on one or more criteria. For instance, each of the plurality of nodes of the DAG may represent a combination of device parameters, and the nodes may be directed within the DAG based on the speed associated with each node, where the speed is determined based on the device parameters represented by the node. In another embodiment, the nodes may be directed in the DAG such that a first node of the DAG may point to a second node of the DAG when it is determined that the second node of the DAG is definitively faster in one or more respects (e.g., with respect to processing speed, etc.) than the first node of the DAG.

Also, in one embodiment, each node in the DAG may represent a unique variation of a plurality of varieties of possible parameters associated with the device or another device. For example, the plurality of possible parameters associated with the device may include a device CPU, a device GPU, and a device resolution, and each node in the DAG may represent a unique combination of a particular type of device CPU, device GPU, and device resolution. In this way, a first node pointing to a second node within the DAG signifies that the plurality of possible parameters associated with the device that are represented by the second node in the DAG offer definitively better processing speed and performance than the plurality of possible parameters associated with the device that are represented by the first node in the DAG.

In addition, in one embodiment, determining the plurality of device parameters may include associating a population value with each node in the DAG. For example, a population value may be assigned to each node in the DAG, where the population value associated with a node corresponds to an exact or approximate number of users (e.g., real-world users, customers, etc.) having the combination of device parameters represented by that node installed in their device. In another embodiment, the population values that may be associated with the nodes in the DAG may be obtained from user data retrieval, user device identification, etc. In yet another embodiment, the population values may be retrieved from a database.

Furthermore, in one embodiment, determining the plurality of device parameters may include approximating (e.g., estimating, etc.) predetermined settings for each node in the DAG, utilizing a greedy algorithm. For example, for each node in the DAG, predetermined settings for running an identified software element may be approximated for the device parameters represented by that node. In another embodiment, the predetermined settings may include optimized settings associated with the identified software element. For example, the predetermined settings for a node may include settings that that result in maximizing an output (e.g., image quality, etc.) while maintaining a threshold requirement (e.g., a minimum frame rate, etc.), while running the software element utilizing the device parameters represented by that node.

In another embodiment, the identified software element may include a software program that may be installed within a device. In another embodiment, the software element may include video game software, video playback software, etc. In yet another embodiment, the software element may be identified in response to a request to determine settings associated with the software element for a system on which the software element is to be run.

Additionally, in one embodiment, one or more nodes in the DAG may have predetermined settings associated with them. For example, a monotonic set of presets may have been determined for one or more unique variations of the plurality of possible parameters associated with the device, where each unique variation is represented by a node in the DAG. See, for example, [NVIDP695], which is hereby incorporated by reference in its entirety, and which describes exemplary methods for determining a monotonic set of presets based on a plurality of parameters. In another example, predetermined settings may be approximated for nodes that do not already have associated predetermined settings.

Further still, in one embodiment, the predetermined settings may be associated with one or more parameters that have been determined based on the plurality of possible parameters associated with the device (e.g., the plurality of parameters associated with a particular node, etc.). See, for example, [NVIDP541], which is hereby incorporated by reference in its entirety, and which describes exemplary methods for determining application parameters based on hardware specifications. In another embodiment, predetermined settings associated with software elements other than the identified software element settings may be correlated to assist in approximating the predetermined settings associated with the identified software element.

Also, in one embodiment, determining the plurality of device parameters may include determining, for each identified node in the DAG, a first subset of nodes in the DAG that are definitively slower than or equal in overall speed and performance to the identified node. For example, all nodes in the DAG that either directly or indirectly point to the identified node may be determined. In another embodiment, determining the plurality of device parameters may include determining, for each identified node in the DAG, a second subset of nodes in the DAG that are definitively faster than or equal in overall speed and performance to the identified node. For example, all nodes in the DAG that are either directly or indirectly pointed to by the identified node may be determined.

Furthermore, in one embodiment, determining the plurality of device parameters may include determining, for each identified node in the DAG, the maximum predetermined settings for the first subset of nodes. For example, the maximum predetermined settings for the first subset of nodes may include the highest settings that were approximated for the nodes within the first subset, utilizing the greedy algorithm. In another embodiment, the maximum predetermined settings for the first subset of nodes may produce the highest image quality within the first subset for a particular threshold (e.g., a minimum allowable frame rate, etc.).

Further still, in one embodiment, determining the plurality of device parameters may include determining, for each identified node in the DAG, minimum predetermined settings for the second subset of nodes. For example, the minimum predetermined settings for the second subset of nodes may include the lowest settings that were approximated for the nodes within the second subset, utilizing the greedy algorithm. In another embodiment, the minimum predetermined settings for the second subset of nodes may produce the lowest image quality within the first subset for a particular threshold (e.g., a minimum allowable frame rate, etc.).

Also, in one embodiment, determining the plurality of device parameters may include determining, for each identified node in the DAG, an error amount associated with the identified node. For example, the error amount for each identified node in the DAG may include a difference between the maximum predetermined settings for the first subset of nodes and the minimum predetermined settings for the second subset of nodes for that identified node. In another example, the difference may be measured in terms of image quality, performance, or any other metric.

Additionally, in one embodiment, determining the plurality of device parameters may include determining, for each node in the DAG, a population-adjusted error amount associated with that node. For example, for each node in the DAG, the population-adjusted error amount may include the determined error associated with that node multiplied by the population value associated with that node. In this way, an amount of users having the combination of device parameters represented by that node installed in their device may affect the possible error associated with that node.

Further, in one embodiment, determining the plurality of device parameters may include identifying a node in the DAG with the greatest population-adjusted error amount. Additionally, the determined plurality of device parameters may include the device parameters represented by the node in the DAG determined to have the greatest population-adjusted error amount.

Further still, as shown in operation 104, the determined plurality of device parameters is tested. In one embodiment, the determined plurality of device parameters may be tested in association with a software element. In another embodiment, the software element may include the identified software element for which predetermined settings have been approximated for the device parameters. In yet another embodiment, testing the determined plurality of device parameters may include determining whether the determined plurality of device parameters can output a predetermined image quality for a particular threshold (e.g., a minimum allowable frame rate, etc.) while running the software element.

In yet another embodiment, testing the determined plurality of device parameters may include determining one or more settings for the plurality of device parameters for running the software element. For example, the device may include a personal computer, and the settings may include predefined settings for one or more elements of hardware and software installed within the device. In this way, testing the determined plurality of device parameters may result in a maximized reduction in overall error within the DAG.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
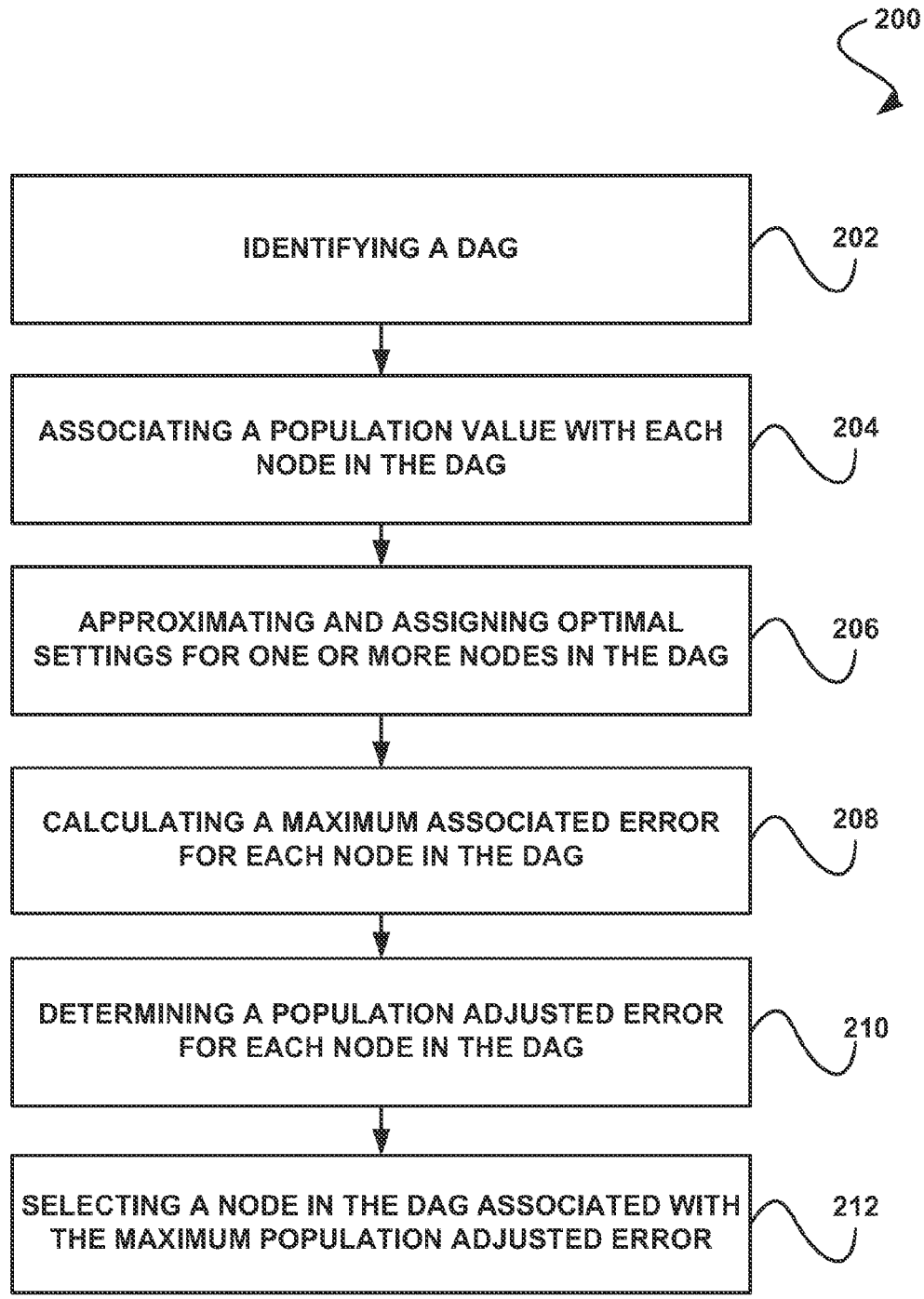
FIG. 2 shows a method for determining a node with a maximum population adjusted error, in accordance with another embodiment.

FIG. 2 shows a method 200 for determining a node with a maximum population adjusted error, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a DAG is identified, where the DAG includes a plurality of nodes each corresponding to a different variation of a fixed plurality of device parameters. In one embodiment, the DAG may be constructed utilizing predetermined device information. In another embodiment, the predetermined device information may be retrieved from one or more manufacturers, one or more users, one or more databases, etc.

In another embodiment, each node in the DAG may represent a unique combination of parameters for the device, and each node in the DAG may be associated with a predetermined speed (e.g., a speed at which the node's unique combination of parameters can process data). For example, a speed may be explicitly calculated or approximated for each unique combination of parameters for the device, and such speed may be associated with its corresponding node.

Additionally, as shown in operation 204, a population value is associated with each node in the DAG. In one embodiment, the population value associated a node may include an approximate number of users (e.g., customers, etc.) that use the variation of device parameters the node corresponds to. In another embodiment, the population value associated a node may include an approximate percentage of end users that use the variation of device parameters the node corresponds to. In yet another embodiment, the population value may be obtained from data retrieved from user devices, statistical reports (e.g., sales forecasts, etc.), or any other source.

Further, as shown in operation 206, optimal settings are approximated for and assigned to one or more of the nodes in the DAG. In one embodiment, the optimal settings may be approximated for and assigned to all nodes in the DAG for which optimal settings have not yet been determined. In another embodiment, the optimal settings for a node in the DAG may include approximated settings for the variation of device parameters the node corresponds to that maximizes an image quality displayed by the device while maintaining a minimum frame rate.

Further still, in one embodiment, the optimal settings approximated for and assigned to one or more of the nodes in the DAG may be associated with a software element. For example, the optimal settings for a node in the DAG may include settings for the variation of device parameters the node corresponds to that maximizes an image quality displayed by the device while maintaining a minimum frame rate, while running the software element utilizing the device parameters represented by that node.

In another embodiment, the optimal settings may be approximated based on settings associated with other software elements. For example, additional software elements determined to be similar in one or more respects to the current software element may be identified. Additionally, optimal settings associated with one or more of the additional software elements (e.g., optimal settings for the variation of device parameters associated with each node in the DAG, etc.) may be correlated to the optimal settings associated with the current software element. In yet another embodiment, one or more aspects of the current software element may be analyzed in order to determine a nature of the software element as well as the additional software elements.

Also, as shown in operation 208, a maximum associated error is calculated for each node in the DAG. In one embodiment, for each node in the DAG, the maximum associated error may be based on a difference between the minimum optimal settings approximated for all nodes in the DAG faster than that node and the maximum optimal settings approximated for all nodes in the DAG slower than that node.

In addition, as shown in operation 210, a population adjusted error is determined for each node in the DAG. For example, for each node in the DAG, the maximum associated error may be multiplied by the population value associated with that node. In this way, the value of the node may be adjusted to reflect the approximate percentage of end users that use the variation of device parameters the node corresponds to.

Furthermore, as shown in operation 212, a node in the DAG associated with a maximum population adjusted error is selected. In one embodiment, selecting the node associated with the maximum population adjusted error may include identifying each population adjusted error determined for each node in the DAG and identifying the population adjusted error with the highest value. In another embodiment, the selected node associated with a maximum population adjusted error may be tested in association with a software element.

For example, the variation of device parameters the node corresponds to may be tested in order to determine optimal settings for the variation of device parameters when running a particular software element, such that the an image quality displayed by a device having the parameters is maximized while maintaining a minimum frame rate when the device is running the software element. In another embodiment, the optimal settings may be assigned to the node in place of the approximated optimal settings previously assigned to the node.

Further still, in one embodiment, the population adjusted error associated with the selected node may be set to zero after the node is tested in association with the software element. In another embodiment, an updated maximum associated error may be calculated for each node in the DAG, taking into consideration the optimal settings assigned to the node. In yet another embodiment, an updated population adjusted error may then be determined for each node in the DAG, and a new node associated with an updated maximum population adjusted error may be selected. In still another embodiment, the determination of the population adjusted error associated with the nodes and the selection of the node with the maximum population adjusted error may be performed utilizing a greedy algorithm. In this way, nodes in the DAG may be selected in a way that maximizes a reduction of overall population adjusted error within the DAG.

Figure 3:
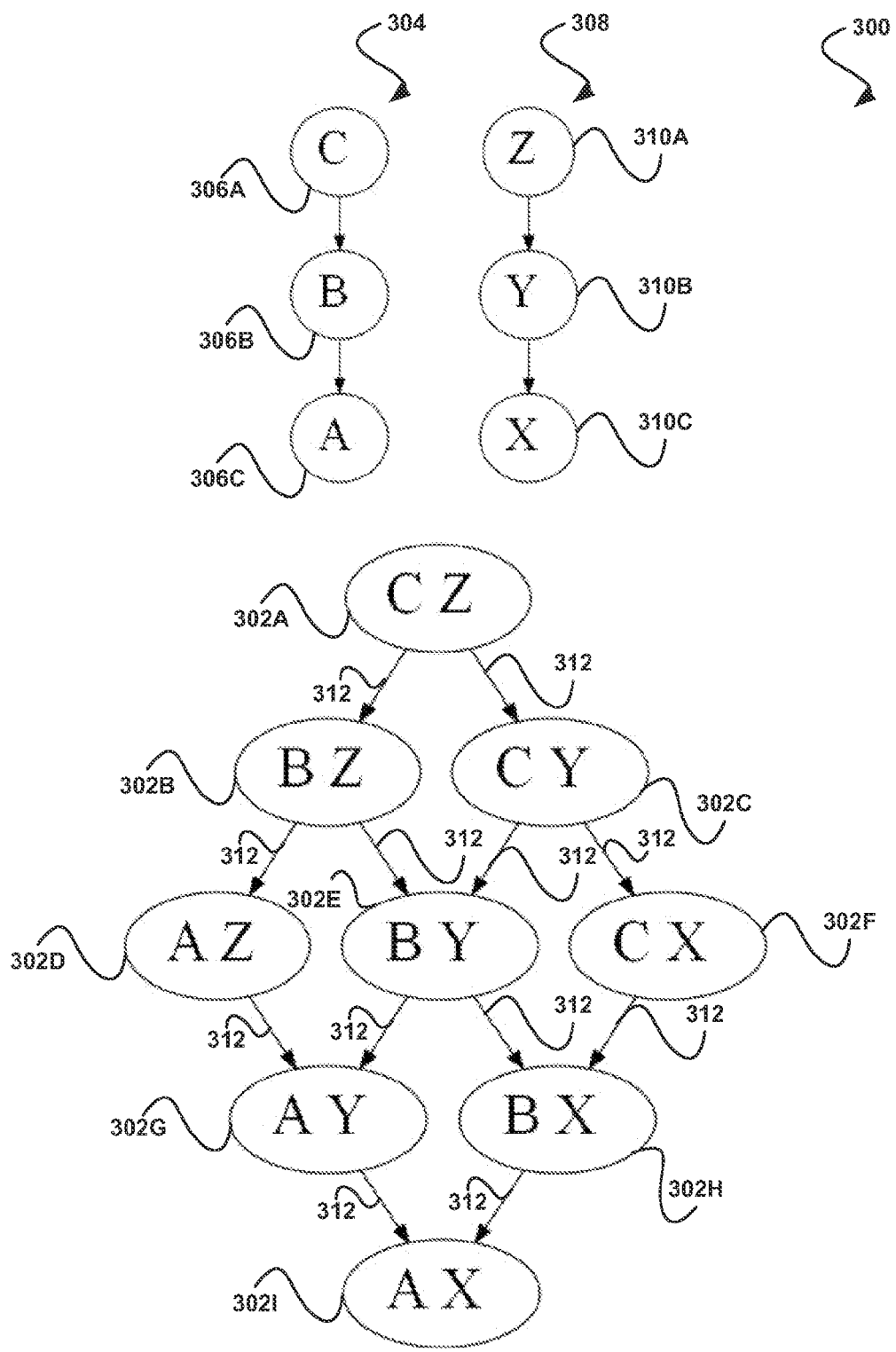
FIG. 3 shows an exemplary parameter DAG, in accordance with another embodiment.

FIG. 3 shows an exemplary parameter DAG 300, in accordance with another embodiment. As an option, the exemplary parameter DAG 300 may be carried out in the context of the functionality of FIGS. 1-2. Of course, however, the exemplary parameter DAG 300 may be implemented in any desired environment. It should also be noted that the aforementioned definitions may apply during the present description.

As shown, the exemplary parameter DAG 300 includes a plurality of nodes 302A-I that each correspond to a unique combination of a first set 304 of variations 306A-C of a first component (e.g., a CPU type, etc.) of a personal computer and a second set 308 of variations 310A-C of a second component (e.g., a GPU type) of the personal computer. In one embodiment, the DAG 300 may include a directed graph with no directed cycles formed by the collection of nodes 302A-I (e.g., vertices, etc.) and a plurality of directed edges 312, such that there is no way to start at any node in the DAG 300 and follow a sequence of edges that eventually loops back that starting node again.

Additionally, the nodes in both the first set 304 of variations 306A-C of the first component and the second set 308 of variations 310A-C of the second component are directed based on processing speed, with slower nodes pointing to faster nodes. As such, the first node 306A is the slowest node in the first set 304, the second node 306B is faster than the first node 306A but slower than the third node 306C in the first set 304, and the third node 306C is the fastest node in the first set 304.

In one embodiment, the speed of each of the nodes 302A-I may be determined utilizing one or more algorithms, benchmark tests, manufacturer disclosures, etc. In another embodiment, the location of the nodes 302A-I within the DAG 300 (including which nodes point to which nodes) may be determined by analyzing properties of components in each node and comparing the overall processing speed of each of the nodes 302A-I.

Additionally, as shown, directed edges 312 point from nodes corresponding to slower unique combinations of parameter variations of the personal computer to nodes corresponding to unambiguously faster unique combinations of parameter variations of the personal computer. In this way, the bottom node 302I corresponds to the fastest unique combination of parameter variations of the personal computer, whereas the top node 302A corresponds to the slowest unique combination of parameter variations of the personal computer.

Figure 4:
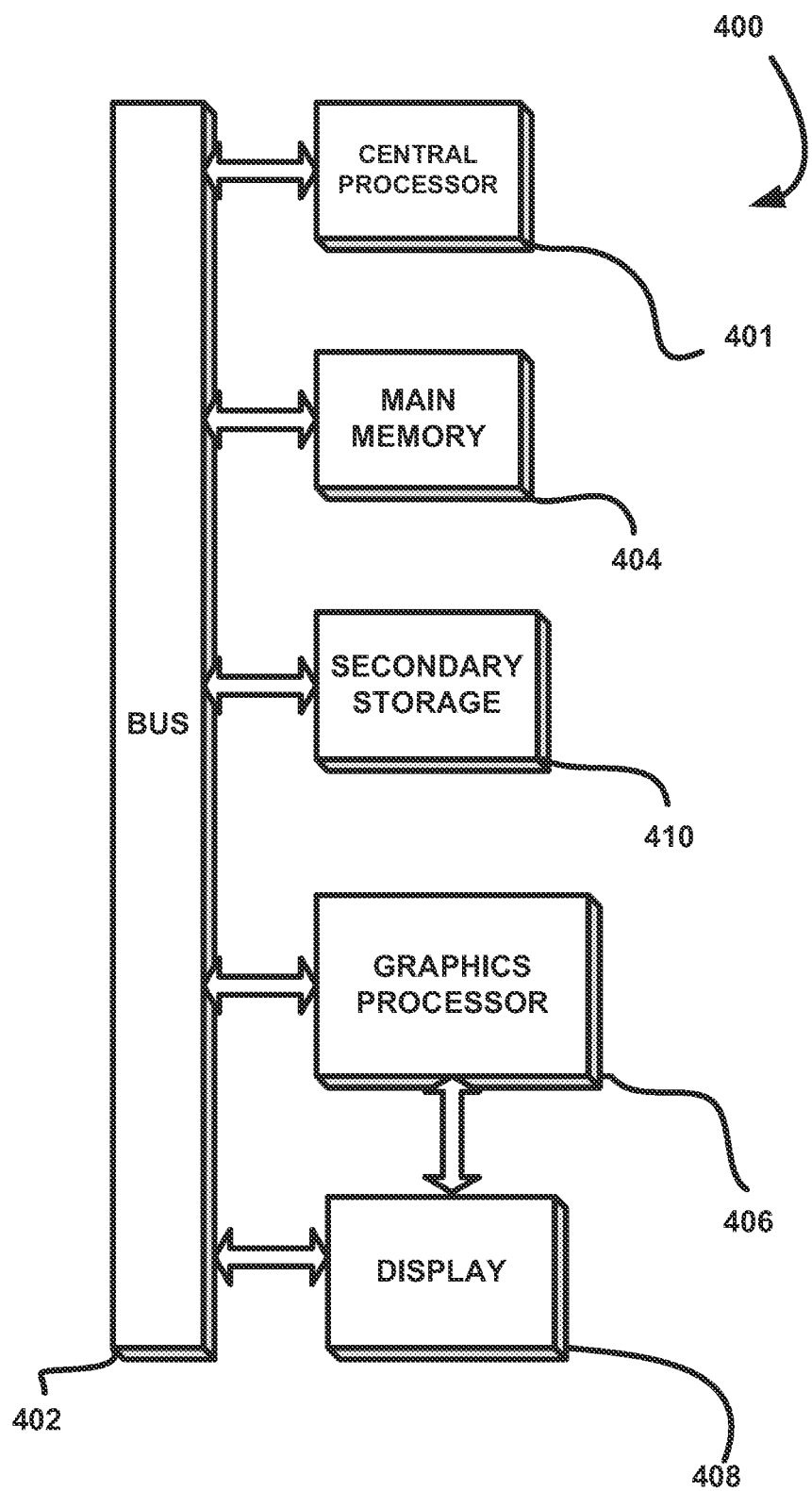
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    determining a plurality of device parameters, utilizing a directed acyclic graph (DAG), wherein the plurality of parameters includes descriptions of hardware or software installed within a device; and
    testing the determined plurality of device parameters.

2. The method of claim 1, wherein the DAG includes a graph that contains a plurality of directed nodes.

3. The method of claim 2, wherein each of a plurality of nodes of the DAG represent a combination of device parameters, and the nodes are directed within the DAG based on a speed associated with each node.

4. The method of claim 2, wherein determining the plurality of device parameters includes associating a population value with each node in the DAG.

5. The method of claim 4, wherein the population value associated with the node corresponds to an exact or approximate number of users having a combination of device parameters represented by that node installed in their device.

6. The method of claim 2, wherein determining the plurality of device parameters includes determining, for each identified node in the DAG, a first subset of nodes in the DAG that are definitively slower than or equal in overall speed and performance to the identified node.

7. The method of claim 6, wherein determining the plurality of device parameters includes determining, for each identified node in the DAG, a second subset of nodes in the DAG that are definitively faster than or equal in overall speed and performance to the identified node.

8. The method of claim 7, wherein determining the plurality of device parameters includes determining, for each identified node in the DAG, maximum predetermined settings for the first subset of nodes, where the maximum predetermined settings for the first subset of nodes includes the highest settings that were approximated for the nodes within the first subset, utilizing a greedy algorithm.

9. The method of claim 8, wherein determining the plurality of device parameters includes determining, for each identified node in the DAG, minimum predetermined settings for the second subset of nodes, wherein the minimum predetermined settings for the second subset of nodes include the lowest settings that were approximated for the nodes within the second subset, utilizing the greedy algorithm.

10. The method of claim 9, wherein determining the plurality of device parameters includes determining, for each identified node in the DAG, an error amount associated with the identified node, where such error amount includes a difference between the maximum predetermined settings for the first subset of nodes and the minimum predetermined settings for the second subset of nodes for that identified node.

11. The method of claim 10, wherein determining the plurality of device parameters includes determining, for each node in the DAG, a population-adjusted error amount associated with that node, where the population-adjusted error amount includes the determined error associated with that node multiplied by the population value associated with that node.

12. The method of claim 11, wherein the determined plurality of device parameters includes the device parameters represented by the node in the DAG determined to have the greatest population-adjusted error amount.

13. The method of claim 9, wherein the minimum predetermined settings for the second subset of nodes produce the lowest image quality within the first subset for a particular threshold.

14. The method of claim 8, wherein the maximum predetermined settings for the first subset of nodes produce a highest image quality within the first subset for a particular threshold.

15. The method of claim 7, wherein the determined plurality of device parameters are tested in association with a software element.

16. A computer program product embodied on a computer readable non-transitory storage medium, comprising:
   code for determining a plurality of device parameters, utilizing a directed acyclic graph (DAG), wherein the plurality of parameters includes descriptions of hardware or software installed within a device; and
   code for testing the determined plurality of device parameters.

17. A system, comprising:
   a processor for determining a plurality of device parameters, utilizing a directed acyclic graph (DAG), wherein the plurality of parameters includes descriptions of hardware or software installed within a device, and testing the determined plurality of device parameters.

18. The system of claim 17, wherein the processor is coupled to memory via a bus.

* * * * *